UNITED STATES PATENT OFFICE.

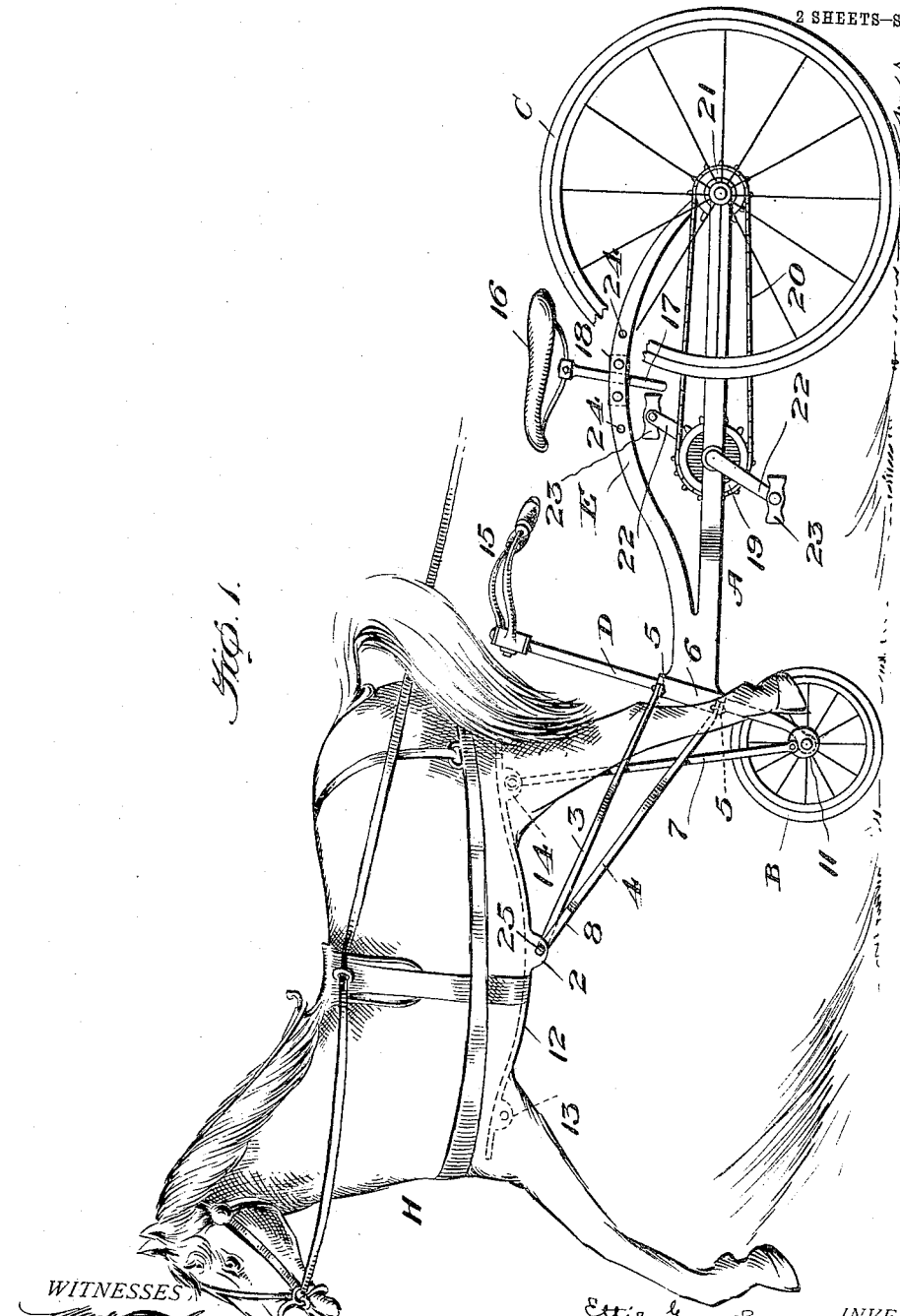

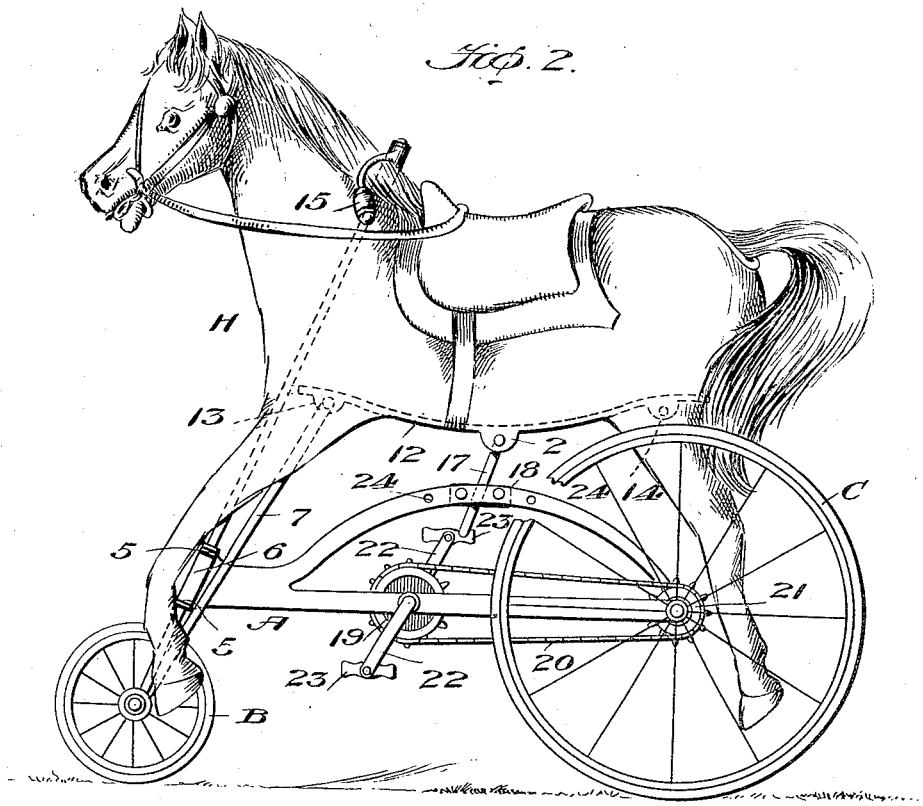

ETTIE GRIMSLEY LANSDEN AND ALVIS C. GRIMSLEY, OF MONTEREY, TENNESSEE.

HOBBY-HORSE AND TRICYCLE.

1,125,698.  Specification of Letters Patent.  Patented Jan. 19, 1915.

Application filed June 12, 1912.  Serial No. 703,195.

*To all whom it may concern:*

Be it known that we, ETTIE GRIMSLEY LANSDEN and ALVIS C. GRIMSLEY, citizens of the United States, residing at Monterey, in the county of Putnam and State of Tennessee, have invented certain new and useful Improvements in Hobby-Horses and Tricycles, of which the following is a specification.

Our invention relates to an improvement in a combined hobby-horse and tricycle, and the object is, as the name implies, to provide a device capable of adjustment so that a hobby-horse can be ridden horse-back or driven in front of the tricycle, or be detached altogether, so that the tricycle may be used without the horse.

With these objects in view our invention consists in a tricycle of approved construction in connection with a horse of suitable size and material capable of being mounted over the machine or forward of it with means for causing the horse to gallop or not, as desired, as well as other novel accessories which will be hereinafter more fully described and pointed out in the claims.

In the accompanying drawings—Figure 1 is a view in side elevation showing the horse in the position of drawing the machine. Fig. 2 shows the horse in position to be ridden. Figs. 3, 4, 5, 6, 7 and 8 are details.

The tricycle may be made in any approved manner preferably of half round tubing and comprises a main frame A, front wheel B, and rear wheels C, one only of which is shown. The fork D is provided with handle bar 15 at the top and an arch E spans the machine from the front box or barrel 6 to the rear axle, the span being composed of two parallel members with a clearance between, and these side members have a number of holes 24, 24 therein to receive bolts which pass through holes in the seat post clamps 18, 18, between which latter is received the adjustable seat post 17, and on the top of which seat post the seat or saddle 16 is received thus admitting of the latter being entirely removed, or being raised or lowered or adjusted forward or backward on the machine.

The pedal shaft is journaled in the frame A and has keyed or otherwise secured thereon, the front sprocket wheel 19 from which a sprocket chain 20 extends rearward to the sprocket wheel 21 on the rear axle. The usual pedal cranks 22, 22 extend from the pedal shaft and have pedals 23, 23 thereon.

The tricycle may be made with or without ball bearings, or with or without rubber tires to suit the requirements of trade.

H represents the horse made of wood, metal or any suitable material and in different sizes to suit the requirements. The horse may be harnessed as shown in Fig. 1, or saddled as shown in Fig. 2, or may be entirely removed if desired and the tricycle used as such entirely without the horse.

A strap 12 of metal is secured lengthwise of the belly of the horse. This is shown in detail in Fig. 3 and is provided with the lugs 2, 2 at or near the center, and 13, 13 and 14, 14 at or near the ends for purposes which will be fully set forth. A top support 3 and lower support 4, shown in detail in Figs. 8 and 7, respectively, are pivotally connected with the lugs 2, 2 by means of a single bolt 25, the lower support 4 being forked at the forward end as at 8 to straddle the forward end of the upper support 3, and both supports 3 and 4 are forked at their lower ends and connected by bolts or pins to the lugs 5, 5 on the box or barrel 6 for the handle bar staff, and a rod 7 extends from the lugs 14, 14 to a wrist pin on the eccentric 11 on the front wheel B.

The foregoing parts are used when the horse is in front of the machine in the position of drawing the latter, and it will be seen that the horse is supported by two pivots, one at the point where the supports 3 and 4 are connected with the horse, and the other where the rod 7 is connected with the animal. When thus constructed the tricycle may be turned and the horse with it with perfect freedom by manipulating the handle bars 15, 15.

When the horse is to be mounted as shown in Fig. 2 over the machine, the supports 3 and 4 and the handle bar and seat or saddle are removed and the rod 7 is disconnected from the lug 14, and pivotally connected with the lugs 13, and the adjustable seat post 17 or a similar device is pivotally attached at its upper end to the lugs 2, 2 and the fork D is removed and passed through a hole in the animal's shoulders to afford support for the animal at the forward end of the machine, thus making a suitable fastening.

Thus we have provided an attractive plaything for small children as well as means for healthful recreation which can be made up and at the same time can be put on the market at a comparatively small cost.

Having fully described our invention, what we claim as new and desire to secure by Letters Patent, is:

1. The combination with a tricycle, of a hobby horse adapted to be interchangeably supported by the tricycle at points respectively in advance of and above the tricycle, detachable means for supporting the horse in advance of the tricycle, propelling means, a seat, means for supporting the seat on the tricycle when the horse is mounted in front thereof, said means being adapted to be secured to and support the horse when the latter is mounted above the tricycle.

2. The combination with a tricycle, of a hobby horse adapted to be interchangeably supported by the tricycle at points respectively in advance of and above the tricycle, detachable means for supporting the horse in advance of the tricycle, propelling means, a seat, means for supporting the seat on the tricycle when the horse is mounted in front thereof, said means being adapted to be secured to and support the horse when the latter is mounted above the tricycle, and means actuated upon the rotation of one of the wheels of said tricycle and connected to the hobby horse in either of the interchangeable positions to transmit a rocking motion to the hobby horse.

3. The combination with a tricycle, of a hobby horse adapted to be interchangeably supported by the tricycle at points respectively in advance of and above the tricycle, detachable means for supporting the horse in advance of the tricycle, propelling means, a seat, means for supporting the seat on the tricycle when the hobby horse is mounted in front thereof, said means adapted to be pivotally secured to and support the hobby horse when the latter is mounted above the tricycle, the pivotal connection formed between the hobby horse and tricycle in either of the mountings being at the approximate longitudinal center of the body of the horse, and means extending from one of the wheels and connected at a point near one end of the hobby horse causing a rocking motion to be transmitted thereto upon the movement of the wheel.

4. The combination with a tricycle, of a hobby horse adapted to be interchangeably supported by the tricycle at points respectively in advance of and above the tricycle, detachable means for supporting the horse in advance of the tricycle, propelling means, a seat, means for supporting the seat at the desired height above the tricycle frame when the hobby horse is mounted in front thereof, said means being adapted to be secured to and support the hobby horse when the latter is mounted above the tricycle.

In testimony whereof we affix our signatures, in the presence of two witnesses.

ETTIE GRIMSLEY LANSDEN.
ALVIS C. GRIMSLEY.

Witnesses:
H. C. LANSDEN,
OTTO GRIMSLEY.

Copies of this patent may be obtained for five cents each, by addressing the "Commissioner of Patents, Washington, D. C."